US007468332B2

(12) United States Patent
Avloni

(10) Patent No.: US 7,468,332 B2
(45) Date of Patent: Dec. 23, 2008

(54) ELECTROCONDUCTIVE WOVEN AND NON-WOVEN FABRIC

(76) Inventor: Jamshid Avloni, 11 Benedita Pl., Moraga, CA (US) 94556

( * ) Notice: Subject to any disclaimer, the term of this patent is extended or adjusted under 35 U.S.C. 154(b) by 205 days.

(21) Appl. No.: 11/219,119

(22) Filed: Sep. 2, 2005

(65) Prior Publication Data

US 2007/0054577 A1 Mar. 8, 2007

(51) Int. Cl.
*B32B 27/04* (2006.01)
*B32B 27/12* (2006.01)

(52) U.S. Cl. ......................... 442/64; 442/110; 442/117; 977/961; 977/755; 977/932

(58) Field of Classification Search ................. 442/110, 442/152, 164, 64, 68, 117, 172, 178–180; 977/712, 720, 755, 773, 775, 784, 932, 796, 977/961, 890–892
See application file for complete search history.

(56) References Cited

U.S. PATENT DOCUMENTS

| | | | | |
|---|---|---|---|---|
| 4,803,096 | A | 2/1989 | Kuhn et al. | |
| 4,877,646 | A | 10/1989 | Kuhn | |
| 4,975,317 | A | 12/1990 | Kuhn | |
| 4,981,718 | A * | 1/1991 | Kuhn et al. | 427/121 |
| 5,030,508 | A | 7/1991 | Kuhn | |
| 5,102,727 | A | 4/1992 | Pittman | |
| 5,108,829 | A | 4/1992 | Kuhn | |
| 5,162,135 | A | 11/1992 | Gregory et al. | |
| 5,536,573 | A * | 7/1996 | Rubner et al. | 428/378 |
| 6,117,554 | A | 9/2000 | Shalaby et al. | |
| 6,316,084 | B1 | 11/2001 | Claus et al. | |
| 6,447,887 | B1 | 9/2002 | Claus et al. | |
| 2005/0229328 | A1 * | 10/2005 | Tran | 8/115.51 |

OTHER PUBLICATIONS

Oregon Aero™ Seat Cushion Systems (http://www.oregonaero.com/p4041_2001.htm).
Soft-Shield 5000 EMI conductive gaskets (http://www.parker.com/chomerics/products/app_ul94v_0_ss5.htm).
Woven into the Hub snowboard jacket with electrically conductive fabric tracks http://www.cellular.co.za/technologies/bluetooth/oneil/oneill_hub-jacket.htm.

* cited by examiner

*Primary Examiner*—Lynda Salvatore

(57) ABSTRACT

The invention relates to an electroconductive textile material and method of preparation thereof. The method consists mainly of two stages: 1) special pretreatment of the fabric substrate for activation and making it suitable for subsequent application and strong attachment of a conductive coating with the use of a layer-by-layer technique (LBL); 2) subsequent application and strong attachment of a conductive coating by means of a layer-by-layer technique. The first stage may be carried out thermally, thermochemically, by treating in hot solutions, or plasma-chemically by plasma treatment. The pre-treatment may be performed, e.g., for swelling and/or for the formation of unsaturated chemical bonds or uncompensated charges in the fabric material. The pretreatment is needed to ensure more efficient penetration of chemical components into the fabric structure during subsequent LBL applications of treatment solutions that contain nano-particles and that determine the density of the molecular layer. The types and amounts of the nano-particles determine their charge density (solution pH is very important for charge density) in the sublayer. Such a pretreatment increases bonds of the applied layers with the substrate material.

7 Claims, No Drawings

ELECTROCONDUCTIVE WOVEN AND NON-WOVEN FABRIC

BACKGROUND OF THE INVENTION

1. Field of the Invention

The present invention relates generally to fabric, and more particularly to fabric which conducts electricity. Such a fabric may find application in the manufacture of antistatic clothes, static charge removal and radio-interference prevention shields of electrical and electronic devices, pressure sensors etc. The invention also relates to a method of manufacturing the aforementioned electroconductive fabric.

2. Description of the Prior Art

In recent years, electroconductive fabric finds ever growing practical application. One example of such applications is so called textile-based electronics, called "electrotextiles." Most of the ongoing research in electrotextiles is driven by the motivation of creating multifunctional fiber assemblies that can sense, actuate, communicate, etc. Wired interconnections of different devices attached to the conducting elements of these circuits are made by arranging and weaving conductive threads so that they follow desired electrical circuit designs.

Another application for electroconductive fabrics is the removal of electrostatic charge from the body of the wearer. The use of such clothes is especially important for workers who operate in clean rooms, e.g., on assembly lines of printed circuit boards, or the like. This is because the electroconductive clothes prevent accumulation of an electric charge and thus the possibility of undesired discharge, e.g., a gas discharge in the operation environment of a clean room. Under conditions of production of electronic devices that are very sensitive to electromagnetic interference, such discharges may destroy an intricate circuit of electronic device components at the production stage.

Electric discharges caused by the accumulation of static electricity accumulated on clothes may be a reason for explosion in hazardous environments with vapors of highly volatile liquids, e.g., gasoline, alcohols, explosives, TNT etc. Cases are known where a small spark caused by the discharge of static electricity from clothes caused the explosion of gasoline vapors which had accumulated in the ambient air. Similarly the combustion of liquid gasoline at the dispensing end of the gas pump has occurred.

One nuisance of static electricity is that many people get unexpected shocks, simply from touching some metal object after walking across the room. One of the biggest complaints that people have about static electricity is that it causes sparks or gives them mild shocks when they touch objects or people. There are also some situations where excess of static electricity can damage equipment or even pose a danger. The reason for the phenomenon is that when certain materials rub together, they build up static electricity. Items that commonly rub together to cause static electricity are clothes rubbing on human skin, furniture and car seats, and soles of shoes rubbing against a rug or floor, etc.

Another example of an application of electroconductive fabric is custom seats. In order to combat static electricity buildup in standard wool seat covers, Oregon Aero Co. developed the Anti-Static Inner Upholstery which draws off the static charge and directs it to the seat frame. This is especially important for aircraft seats that are packed with extensive electronic equipment and need anti-static inner upholstery.

There may be many other application examples for antistatic fabric: the use of electroconductive fabrics for heating sportwear, the lining of the casings of electronic devices for shielding against electromagnetic radiation to prevent electromagnetic interference with radio receivers, TV sets, telephones, etc., cable shielding, and military uses for special devices equipped with protective electroconductive fabric coatings that provide a predetermined electromagnetic impedance thereby screening against radio location.

Chomerics, a division of Parker Hannifin, has unveiled a line of Soft-Shield 5000 EMI gaskets designed to meet shielding and mechanical performance requirements of commercial electronic enclosures used in cellular communications. The gaskets consist of an electrically conductive fabric jacket over soft urethane foam.

Woven into The Hub snowboard jacket are electrically conductive fabric tracks that connect a chip module to a fabric keyboard and built-in speakers in the helmet. The chip module contains an MP3 player and Bluetooth capabilities from which the snowboarder can control a mobile phone. When the phone feature is used, the stereo system acts as the headset. The microphone is integrated into the collar of the jacket.

The smart-fabric and interactive-textile market has growth potential and according to a Boston-based research firm, worldwide sales could reach approximately $1 billion for "intelligent textile materials" by 2007.

It should be noted that the use of the electroconductive fabric should not impair the basic function of the object. For example, in the case of cloth or seats the product should present an attractive appearance, have wearability, and in sport-wear be lightweight and durable, etc.

The fabrics used for EC purposes may be woven, non-woven, synthetic and natural, etc. There are many methods of manufacturing. The fabric can be woven entirely from electroconductive threads, or electroconductive threads can be interweaved with conventional threads. In addition, the electroconductive fabric may have different patterns of weaving, etc.

For example, electroconductive fabrics can be manufactured by mixing or blending a conductive powder with a polymer melt prior to the extrusion of the fibers from which the fabric is made. Such powders may include, for instance, carbon black, silver particles or even silver- or gold-coated particles. When conductive fabrics are made in this fashion, however, the amount of powder or filler required may be relatively high in order to achieve any reasonable conductivity and this high level of filler may adversely affect the properties of the resultant fibers. It is theorized that the high level of filler is necessitated because the filler particles must actually touch one another in order to obtain the desired conductivity characteristics for the resultant fabrics.

Such products have some significant disadvantages. For instance, the mixing of a relatively high concentration of particles into the polymer melt prior to extrusion of the fibers may result in undesired alteration of the physical properties of the fibers and the resultant textile materials. Also, it is difficult to spin fibers which are highly loaded with conductive particles. Dark colors which result from this process may also be unwanted.

Antistatic fabrics may be made by incorporating conductive carbon fibers, or carbon-filled nylon or polyester fibers in woven or knit fabrics. Alternatively, conductive fabrics may be made by blending stainless steel fibers into spun yarns used to make such fabrics. While effective for some applications, these "black stripe" fabrics and stainless steel containing fabrics are expensive and of only limited use. Also known are metal-coated fabrics such as nickel-coated, copper-coated and noble metal-coated fabrics. However the process to make such fabrics is quite complicated and involves expensive catalysts such as palladium or platinum, making such fabrics impractical for many applications. There are also carbon black-inpregnated fibers which are widely used in the clean room industry. These black fibers are used in combination with white insulating fibers to produce the desired fabric resistance and lighter colors. However, this conductive grid might lead to a hot and cold spot phenomenon whereby this fabric could still accumulate static charges.

Polypyrrole can be produced by either an electrochemical process where pyrrole is oxidized on an anode to a desired polymer film configuration or, alternatively, pyrrole may be oxidized chemically to form polypyrrole by using ferric chloride or other oxidizing agents. While conductive films may be obtained by means of these methods, the films themselves are insoluble in either organic or inorganic solvents and, therefore, they cannot be reformed or processed into desirable shapes after they have been prepared.

The problems inherent in antistatic fabrics made from the use of chemical oxidative precipitation of conductive polymers on textile substrates were overcome by the processes disclosed in U.S. Pat. No. 4,803,096 issued on Feb. 7, 1989 to H. Kuhn, et al. The authors of the aforementioned patent have found that textile substrates can be made more uniformly electrically conductive, with adherent polymer coatings, and with reduced waste of reactants, by bringing the textile substrate into contact with an aqueous solution of a pyrrole or aniline compound and an oxidizing agent and a doping agent or counter ion, while constantly agitating the solution; thereby depositing onto the surface of the individual fibers of the textile substrate the forming polymer or prepolymer of the pyrrole or aniline monomer. By such means a uniform and coherent covering of an ordered, conductive film of the polymerized pyrrole or aniline compound is generated on the surface of the substrate fibers.

While the process previously described in U.S. Pat. No. 4,803,096 provides significant improvements over the prior art techniques, nevertheless, in practice it is often difficult to provide the precise process controls required to appropriately adjust the rates of polymer formation and adsorption, especially within appropriate boundaries for a commercial process. The use of low reaction temperatures, e.g. down to about 0° C. or below, for slowing the reaction rate is often inconvenient and adds additional expense to the overall process by virtue of increased energy costs and increased production time per unit of product.

It was pointed out in the prior application that one controlling factor in assuring that the forming pre-polymer species forms at an appropriate rate to be taken up on the textile material without forming polymer in solution is the availability or concentration of the oxidant in the aqueous solution.

The authors of the above invention made an attempt to control the availability and concentration of the iron salt oxidant, particularly $FeCl_3$ in the aqueous solution as a means of controlling the rate of oxidative polymerization of the pyrrole monomer. However, the addition of conventional complexing agents for ferric $Fe^{+3}$ ion, such as ethylene diamine tetraacetic acid (EDTA) and potassium thiocyanate (KSCN), completely stopped the polymerization of pyrrole, presumably by virtue of forming irreversible or strong complexes with $Fe^{+3}$ and preventing oxidation of the pyrrole monomer to the reactive species.

However, further research has led to the discovery that there is a class of compounds which are presumably capable of forming weak complexes with $Fe^{+3}$ and that when these complexing agents are included in the aqueous solution with the pyrrole monomer they effectively, controllably release the ferric ions and allow the polymerization to proceed at a rate such that the forming prepolymer species is deposited onto the surface of the fibers of the textile material as quickly as it is formed. As a result of this controlled release of ferric ions the conductive polymer film can be formed on the textile material at room temperature with uniform and coherent properties normally obtainable otherwise only at substantially lower temperatures (e.g. about 0° C.) in the absence of the complexing agent.

According to the above invention, it was found that the addition to the aqueous solution of pyrrole monomer, ferric oxidant, and optional dopant or counter ion, of certain complexing agents for the ferric oxidant provides a more effective means for controlling the rate of polymer formation.

Another invention aimed at the manufacture of conductive fabrics based on the use of a pyrrole compound is disclosed in U.S. Pat. No. 4,877,646 issued on Oct. 31, 1989 to Hans H. Kuhn, et al. Fabrics are made electrically conductive by exposing the fabric fiber under agitation conditions to an aqueous solution of a pyrrole compound, an oxidizing agent and a doping agent or counter ion and thereby depositing onto the surface of individual fibers of the fabric a prepolymer of the pyrrole compound so as to uniformly and coherently cover the fibers with a conductive film of the polymerized pyrrole compound and wherein, furthermore, the oxidizing agent is a ferric salt and the aqueous solution further contains a weak complexing agent for ferric ions to effectively control the reaction rate such that the prepolymer is uniformly and coherently adsorbed onto the surface of the textile material, thereby providing improved films of electrically conductive polymerized compound on the textile material.

U.S. Pat. No. 4,975,317 issued on Dec. 4, 1990 to Kuhn; Hans H. is aimed at further improvement of electrically conductive textile materials and method of their manufacture. According to the above invention, fabrics are made electrically conductive by contacting the fabric under agitation conditions with an aqueous solution of a pyrrole or aniline compound, and an oxidizing agent and a doping agent or counter ion; and then epitaxially depositing onto the surface of the individual fibers of said fabric the in status nascendi [in the nascent state] forming polymer of the pyrrole or aniline compound so as to uniformly and coherently cover the fibers with an ordered conductive film of the polymerized pyrrole or aniline compound. Individual fibers and yarns can be similarly treated and then formed into fabrics.

The next US Patents of Kuhn; Hans H., i.e., U.S. Pat. No. 4,981,718 issued on Jan. 1, 1991 and U.S. Pat. No. 5,030,508 issued on Jul. 9, 1991 relate generally to a method for making electrically conductive textile materials by contacting the fiber under agitation conditions with an aqueous solution of an aniline compound, oxidizing agent and a doping agent or counter ion and then depositing onto the surface of individual fibers of the fabric a prepolymer of the aniline compound so as to uniformly and coherently cover the fibers with a conductive film of the polymerized aniline compound and wherein, furthermore, the oxidizing agent is a vanadyl compound whereby the reaction rate is controlled such that the prepolymer is uniformly and coherently absorbed onto the surface of the textile material, thereby providing improved films of electrically conductive polymerized compound on the textile material.

The second basic improvement in the inventions relating to manufacture of electroconductive fabric with the use of pyrrole is disclosed in U.S. Pat. No. 5,108,829 issued on Apr. 28, 1992 to H. Kuhn. The process described in this patent is characterized by introduction in the fabric treatment solution of anthraquinone-2-sulfonic acid as a dopant. According to one embodiment of the aforementioned invention, a method is provided for imparting electrical conductivity to textile materials by exposing the textile material to an aqueous solution of an oxidatively polymerizable pyrrole compound and an oxidizing agent capable of oxidizing said pyrrole compound to a polymer. This reaction is carried out in the presence of an anthraquinone-2-sulfonic acid or sulfonate as a counter ion or doping agent to impart electrical conductivity to the polymer, and under conditions at which the pyrrole compound and the oxidizing agent react with each other to form a conductive polymer coating on the textile material. An advantage of this invention is that a large excess of dopant is not required to achieve high conductivity in the conductive textile material. Another advantage is that in addition to high conductivity, the textile material demonstrates superior stability.

In some applications, it is desirable that a material incorporating a conductive polymer exhibit anisotropic properties, i.e. non-uniform conductivity, such as a gradient of decreasing conductivity in a particular direction. The invention aimed at the solution of this problem is disclosed in U.S. Pat. No. 5,162,135 issued on Nov. 10, 1992 to R. Gregory et al. The invention relates to a conductive polymeric material such as a textile fabric having a conductive polymer film that may be treated with a solution containing a chemical reducing agent to reduce its conductivity. By selectively reducing portions of the conductive polymer in varying degrees, a gradient of conductivity may be produced in the material. After the conductive polymer has been reduced to a target level, the reducing solution may be removed with a hot water rinse.

An example of other inventions related to manufacturing electroconductive fabric is U.S. Pat. No. 5,102,727 issued on Apr. 7, 1992 to Pittman; Edgar H., et al. This invention provides an electrically conductive textile fabric having a conductivity gradient created by varying the relative concentration of high and low conductivity yarns during construction of the fabric. In the case of woven and knitted fabrics, the relative number of high and low conductivity yarns per inch may be varied in the warp or weft direction or both.

U.S. Pat. No. 6,117,554 issued on Sep. 12, 2000 to S. Shalaby, et al. describes modulated molecularly bonded inherently conductive polymers on substrates with conjugated multiple lamellae and shaped articles thereof. Organic inherently conductive polymers, such as those based on polyaniline, polypyrrole and polythiophene, are sequentially formed in-situ onto polymeric surfaces that are chemically functionalized to molecularly bond the conductive polymers to the substrates. The polymeric substrate is preferably a preshaped or preformed thermoplastic film, fabric, or tube, although other forms of thermoplastic, and thermoset polymers can be used as the substrates for functionalization using, most preferably, phosphonylation-based processes followed by exposure to an oxidatively polymerizable compound capable of forming an electrically conductive polymer. It has been found that the degree of electrical conductivity may be modulated by bonding further electrically conductive layers to the article. That is, each underlying conductive layer is functionalized prior to bonding of a subsequent conductive layer thereto until the degree of conductivity is achieved. In an alternative embodiment, metals such as gold or platinum may be bonded to one of the functionalized surfaces.

Broadly, the method of the above invention is directed to a surface functionalizing step which renders the outer surface of the polymeric article reactive by providing acid-forming functional groups with each group having a multivalent central atom followed by a polymerization step whereby a precursor monomer of a conductive polymer is polymerized directly onto the reactive surface. In addition to providing for molecular bonding of the conductive polymer to the article's surface, the functional groups act, as least in part, as both a doping agent and an oxidizing agent to aid in polymerization. A second conductive polymer layer is similarly formed onto the initial conductive polymer layer. That is, the initial conductive polymer layer is then subjected to the above-mentioned surface functionalizing step whereby acid-forming functional groups are bonded to that initial layer; a precursor monomer of a conductive polymer is then polymerized directly onto that reactive surface. The second conductive polymer layer may be identical to or different from the initial conductive polymer layer. Subsequent conductive polymer layers are formed onto underlying layers in the same way.

The Kuhn process (in-situ polymerization and deposition of ICPs) is working well for polar surfaces of such substances as nylon, polyester, Kevlar, glass, cotton etc, but the adhesion of ICPs to PE and PP is not good. Therefore, U.S. Pat. No. 6,117,554 is mostly targeting the problem of adhesion of inherently conductive polymers (ICPs) to the surface of polyolefines (polyethylene PE, polypropylene PP) and teflons. U.S. Pat. No. 6,117,554 describes a modification of the hydrophobic polymer surface to introduce acidic groups. In fact, this is essentially the same process as described above in the Kuhn and Kuhn et al. patents with pre-treatment of the polymer surface.

Thus, it can be concluded that the methods and textile structure described in U.S. Pat. No. 6,117,554 will entail the disadvantages of the Kuhn technique since it uses essentially the same ICP, though with some improvement of chemical adhesion to PP and PE.

An attempt has been made to improve stability against heat, moisture, and laundering by hindering the extraction of dopants. Such an attempt is disclosed in by S. A. Asharaf, et al. in the report at the Avantex Symposium, Frankfurt, June 2005. The proposed method is based on the following two concepts: 1) Diffusing ICPs into the fabric fibers by the prolonged impregnation method and; 2) Preadsorption of large dopant molecules (templates or polymeric acids) onto fabric for subsequent use in situ by the Kuhn method. Although the S. A. Asharaf method can be considered as a next step towards improved thermal and environmental stability of the electroconductive fabric as compared to the Kuhn's technique, S. A. Asharaf's is inferior to Kuhn's technique with regard to electroconductivity.

U.S. Pat. No. 6,316,084 issued on 2001 to Richard Claus et al. relates to transparent abrasion-resistant coatings, magnetic coatings, electrically and thermally conductive coatings, and UV absorbing coatings on solid substrates. Abrasion and scratch protective coatings magnetic coatings, electrically and thermally conducting coatings, and UV absorbing coatings are provided by electrostatic self-assembly (ESA) of one layer of an organic or polymer molecule and one layer of inorganic clusters in a layer by layer fashion at room temperature. A combination of inorganic clusters having a particle size of preferably less than 30 nm and flexible organic molecules allows fabrication of films tens to hundreds of micrometers thick, with large pores and excellent stress relaxation.

Although the method disclosed in that patent relates mainly to application of wear-resistant coatings, one of the objects also includes imparting to the substrate material electroconductive properties by application of coatings with the proposed method.

Another US Patent issued to Richard Claus et al. in 2002 is U.S. Pat. No. 6,447,887 describes electrostrictive and piezoelectric thin film assemblies and method of fabrication therefor. The electrostatic self-assembly method of fabricating electrostrictive and piezoelectric thin film assemblies not only provides a thinner film than is attainable by conventional methods, but provides excellent molecular-level uniformity and precise structural control, and thus large, effective piezoelectric coefficients. The method produces a thin film assembly including (a) a substrate, and (b) a film having one or a plurality of layers disposed upon the substrate, wherein at least one of the layers includes a dipolar material, and this layer of dipolar material has a uniform thickness of at most 500 nm.

An invention that is worth mentioning in connection with the subject of the present invention is one disclosed in U.S. Pat. No. 5,536,573 issued on 1996 to Michael Rubner. The invention relates to a molecular self-assembly of electrically conductive polymers. A thin-film heterostructured bilayer is formed on a substrate by a molecular self-assembly process based on the alternating deposition of a p-type doped electrically conductive polycationic polymer and a conjugated or nonconjugated polyanion or water soluble, non-ionic polymer. In this process, monolayers of electrically conductive polymers are spontaneously adsorbed onto a substrate from dilute solutions and subsequently built-up into multilayer thin films by alternating deposition with a soluble polyanion or water soluble, non-ionic polymer. In contrast to a deposition process involving the alternate self-assembly of polycations and polyanions, this process is driven by non-covalent bonded attractions (for example, ionic and hydrogen bonds) developed between a p-type doped conducting polymer and a polymer capable of forming strong secondary bonds. The net positive charge of the conducting polymer can be systematically adjusted by simply varying its doping level. Thus, with suitable choice of doping agent, doping level and solvent, it is possible to manipulate a wide variety of conducting polymers into uniform multilayer thin films with layer thicknesses ranging from a single monolayer to multiple layers. This method leads to conductive coatings that are still vulnerable to heat, moisture, ultraviolet radiation and washing.

In spite of a great variety of methods for manufacturing and treating electroconductive textiles, there is still room for the improvement. For example, a common disadvantage which remains for the conventional electroconductive textile is that with the lapse of time electrical characteristics are impaired, at least in some applications. Another disadvantage of the known electroconductive fabrics is that they are insufficiently stable to environmental conditions, such as humidity and temperature. Electroconductive textile materials, e.g., those that are produced by the Kuhn method, are not sufficiently resistive to laundering. This is because the dopant used in the above method is leachable, i.e., has water-soluble molecules.

SUMMARY OF THE INVENTION

It is an object of the invention to provide an electroconductive textile material that does not loose its electrical characteristics with the lapse of time. It is another object of the invention to provide an electroconductive fabric that is stable to environmental conditions, such as humidity, temperature and ultraviolet radiation. It is another object to provide a method of manufacturing electroconductive textile material that allows easy control of electrical resistivity of the material. It is a further object of the invention to provide an electroconductive textile material and a method of manufacturing thereof that allow one to obtain such aforementioned material with chosen electrical characteristics. It is a further object of the invention to provide the method of manufacturing an electroconductive fabric with the use of a layer-by-layer technique that does not necessarily change or impair the properties of the fabric substrate, such as color, strength, etc.

The method of the invention consists of two stages: 1) special pretreatment of the fabric substrate for activation, making it suitable for subsequent application and strong attachment of a conductive coating with the use of a layer-by-layer technique; 2) subsequent application and strong attachment of a conductive coating by means of a layer-by-layer technique.

The first stage, i.e., special pretreatment, may be carried out thermally, thermochemically, as by treating in hot solutions, or plasma-chemically by plasma treatment. The pretreatment may be performed, for swelling and/or for the formation of unsaturated chemical bonds or uncompensated charges in the fabric material. The pretreatment is needed to ensure improved conductivity, stability of conductive fabric, and better adhesion of LBL layers.

The hot suspension for pretreatment may also contain well-dispersed conductive nanoparticles. The types and amounts of nano-particles would determine their charge density in the sublayer, which is formed at the substrate surface during the pretreatment. In addition, the pH of the pretreatment solution may also be very important for the eventual charge density of this pretreatment sublayer. This pretreatment also increases the amount of bonds between the applied layers and the substrate material.

The aforementioned special pretreatment of the fabric is not necessarily impregnation by exposure to a solution and may comprise, e.g., plasma treatment of the fabric, natural or synthetic. This process consists of treating the fabric in a plasma chamber for a predetermined period of time. The time of treatment depends on the properties of the fabric substrate to be treated and on the parameters of plasma, such as plasma density and type of active plasma particles. In a majority of cases, oxygen or air plasma is used for this purpose.

The second stage consists of treatment of the fabric pretreated in the first stage by means of the aforementioned layer-by-layer technique. As has been mentioned above, in the context of the present invention the LBL technique means a layer-by-layer application of layers of nanoparticles, i.e., thin monolayers of nanoparticles having a thickness not exceeding 300 nanometers. A conductive coating applied in the second stage is composed of one or several electronically or ionically conductive, charged polymers (i.e., polyelectrolytes) or conductive nanoparticles applied by means of the LBL technique onto the aforementioned pretreated textile material substrate made from any required textile substrate, such as synthetic or natural fibers. This is achieved by stepwise layer by layer deposition of the oppositely charged species from polymer solutions or particle dispersions and subsequent washing of the substrate surface in between dippings. The solution suitable for the LBL application of the conductive coatings may comprise, e.g., inherently conductive negatively charged interpolymer complexes (with electronic conductivity), such as an aqueous solution of a polyaniline doped with an excess of poly(styrenesulfonic) acid, polyaniline doped with an excess of ligninsulfonic acid, poly(ethylenedioxythiophene) doped with an excess poly(styrenesulfonic) acid, polypyrrole doped with an excess poly(styrenesulfonic) acid, poly(anilinesulfonic acid), or ionic conductors such us an aqueous solution of poly(styrenesulfonic) acid, poly(2-acrylamido-2-methyl-1-propanesulfonic acid), an aqueous solution of a poly(acrylic) acid, sodium salt, heparin, etc., or cationic polyelectrolytes such as an aqueous solution of a poly(diallyldimethylammonium) chloride solution, an aqueous solution of a polyethyleneimine, poly(acrylamide-co-diallyldimethylammonium chloride), etc. in combination with stable electronically conductive nanoparticles of opposite charge.

Most of the above polyelectrolytes are ionic conductors and require moisture to be conductive. Therefore the electrical conductivity of these coatings will be low and will depend on humidity, so one needs to use stable electronically conductive nanoparticles in combination with these polymers to make stable coatings.

The conductive coatings obtained by the method of the invention are uniform and more stable to UV light, laundering, heat and humidity. Excellent adhesion to the substrate makes these coatings clean for electronics applications (i.e., no contaminants: particulates and leachable ions).

DETAILED DESCRIPTION OF THE INVENTION

According to the present invention conductivity can be imparted to various textile materials, the fabric substrate of which can be woven or non-woven, natural or synthetic, etc. More specifically, the fabrics suitable for obtaining conductivity by the method of the invention may be woven fabric, non-woven fabric, natural fabric such as cotton, wool, and silk, synthetic fabric such as nylon, polyester, polypropylene, Kevlar, and lycra-spandex, fabric that contains both natural and synthetic fiber, or inorganic material fabric such as glass fiber fabric, quartz fiber fabric, etc.

In its initial state, the fabric substrate can be inherently neutral or charged positively or negatively. If the fabric substrate is initially neutral, a special treatment is carried out for making it charged in accordance with the embodiment of the method of the invention with subsequent treatment.

Although the fabric can be non-treated, or pre-treated directly (e.g., by the prolonged impregnation method which in the context of the present patent application means prolonged impregnation of conductive particles from a hot suspension) in general, the method of the invention may consist of two stages: 1) special pretreatment of the fabric substrate for activation and making it suitable for subsequent application and strong attachment of a conductive coating with the use of a layer-by-layer deposition technique; 2) subsequent application and strong attachment of a conductive coating by means of a layer-by-layer technique.

The first stage, i.e., special pretreatment may be carried out thermally, thermochemically, by treating in hot solutions, or plasma-chemically by plasma treatment, or by other methods. The pre-treatment may be performed for swelling and/or for the formation of unsaturated chemical bonds or uncompensated charges in the fabric material. The pretreatment is needed to ensure more efficient penetration of chemical components into the fabric structure with subsequent LBL application of treatment solutions that contain nano-particles that determine the density of the molecular layer. The type and concentration of the nano-particles in the treatment solution determine their charge density in the sublayer formed by the pretreatment. Furthermore, the pH of the pretreatment solution is also a factor contributing to the charge density of this sublayer. Such a pretreatment increases the bonds between the applied layers and the substrate material.

Pretreatment may be carried out by prolonged impregnation, e.g, by dipping the fabric into a pretreatment solution or suspension.

An example of thermal pretreatment may consist of boiling for 3 or more hours in deionized water, or in weak acidic or weak alkaline solution, e.g., at 100° C. or more.

The aforementioned special pretreatment of the fabric is not necessarily impregnation by dipping or boiling and may be a plasma treatment of the fabric, natural or synthetic. The process consists of treating the fabric in a plasma chamber for a predetermined period of time. The time of treatment depends on the properties of the fabric substrate to be treated and on the parameters of the plasma, such as plasma density and type of active plasma particles. In a majority of cases, oxygen or air plasma is used for this purpose.

The plasma may be based on other working gases, such as argon with minute quantities of chlorine, e.g., for treating fabrics with a substrate made from non-polar polymers. A textile material of any type can be especially efficiently pretreated with the use of air as a working gas supplied to the plasma chamber. The plasma density recommended for the process should be within the range of $10^8$ to $10^{11}$ $cm^{-3}$ at a pressure in the chamber from several milliTorr to 200 milliTorr. Such air plasma can be easily ignited in a capacitive type plasma reactor or in ICP (inductance coupled plasma) type reactor. It should be noted that the temperature of the working gas in the plasma chamber should not exceed the glass transition temperature Tg for polymers of the fabric substrate. The temperature of the electron component of such plasma may be as high or higher than $10^2$ eV. This value is more than sufficient for activation of the molecules in the yarn of the surface layer of the fabric. Time of treatment depends on the types and characteristics of the material treated but, normally, does not exceed several minutes.

In the plasma chamber of the reactor, a textile material that has to be pretreated is normally located at a predetermined distance from the plasma confinement area. This distance depends on the characteristics of the plasma and treatment conditions and may be determined experimentally.

Plasma treatment may be carried under atmospheric pressure. Such processes are less expensive than those conducted in a vacuum and require a slightly longer treatment time. A significant advantage of the plasma treatment under atmospheric pressure is easy control of the process temperature. In contrast to the vacuum processes, the atmospheric pressure process allows for the maintaining of the working gas at a relatively low temperature. In the case of low-temperature plasma at atmospheric pressure, optimization of the ionization process produces a continuous and homogeneous plasma cloud. A carrier gas may comprise helium that is selected due to its unique inertness, high thermal conductivity and other unique physical properties that allow for the most stable low temperature atmospheric plasma to be formed. Adding small amounts of oxygen ($O_2$) to the He carrier gas enables the rapid oxidation of surface chemical groups and contaminants. It is important to note that with addition of some amount of hydrogen-containing gases, the plasma can reduce the surface of the fabric material.

An example of an apparatus commercially available for the atmospheric pressure plasma treatment of fabrics is the one (Plasma3™system) produced by Enercon Industries', Danbury, Conn., USA.

The second stage consists of treatment of the fabric pretreated in the first stage by means of the aforementioned layer-by-layer deposition technique. The second stage, i.e., the LBL process, may consist of alternating treatment in two liquid media, i.e., 1) a solution of an anionic or cationic polymer and 2) a suspension of charged conductive nanoparticles and/or conductive polymer. It is preferable that the charged nanoparticles are uniformly dispersed in the liquid media.

In the context of the present invention, the term "solution of a conductive polymer" also covers "suspension of a conductive polymer".

Another example of radiation pretreatment is UV (ultraviolet) and VUV (vacuum ultraviolet) pretreatment. UV treatment may be carried by utilizing, e.g., powerful Hg lamps of high pressure with radiation wavelength above 300 nm. VUV treatment can be carried by using powerful excimer lamps on rare gases such as Krypton that produces radiation at a wavelength of 148 nm and Xenon that produces radiation at a wavelength of 172 nm.

As has been mentioned above, in the context of the present invention the LBL technique means a layer-by-layer deposition of monolayers, i.e., thin mono/molecular layers each having a typical thickness in the range of two to ten of nanometers, but sometimes may be as thick as 300 nm or more.

The conductive coating applied in the second stage is a first layer obtained by means of the aforementioned solution of an anionic or cationic polymer and composed of one or several electronically or ionically conductive, charged polymers (i.e., polyelectrolytes) and a second layer obtained from the aforementioned suspension and composed of oppositely charged conductive nanoparticles. This is achieved by stepwise layer by layer deposition, e.g., a deposition of an oppositely charged species from the polymer solutions and particles from dispersions with washings of the substrate fabric between dippings to remove the excess of charged species.

Examples of the anionic polyelectrolytes suitable for the invention are the following: aqueous or non-aqueous solutions of poly(2-acrylamido-2-methyl-1-propanesulfonic acid), poly(2-acrylamido-2-methyl-1-propanesulfonic acid-co-acrylonitrile), poly(2-acrylamido-2-methyl-1-propanesulfonic acid-co-styrene), poly(acrylic acid), sodium salt, sodium salts of polyacrylic acid having different molecular weights, sodium salt of poly(anetholesulfonic acid), poly(anilinesulfonic acid), poly(sodium 4-styrenesulfonate), poly (sodium 4-styrenesulfonate), poly(sodium 4-styrenesulfonate, poly(sodium 4-styrenesulfonate), poly(styrene-alt-maleic acid) sodium salt, poly(4-styrenesulfonic acid), poly(4-styrenesulfonic acid) ammonium salt, poly(4-styrenesulfonic acid) lithium salt, poly(4-styrenesulfonic acid) sodium salt, poly(4-styrenesulfonic acid) sodium, poly(4-styrenesulfonic acid-co-maleic acid) sodium salt, poly(4-styrenesulfonic acid-co-maleic acid) sodium salt, poly(vinyl sulfate) potassium salt, poly(vinylsulfonic acid) sodium salt, poly(4-styrenesulfonic) acid sodium salt, heparin etc.

Examples of cationic polyelectrolytes are the following: aqueous solutions of Poly(acrylamide-co-diallyidimethylammonium chloride), poly(allylamine hydrochloride), poly (diallyldimethylammonium chloride), and manganese(II) hexafluoroacetyl acetonate trihydrate, poly(vinylpyridine), manganese(II) hexafluoroacetyl acetonate trihydrate, polyethyleneimine, etc.

Examples of positively charged p-doped intrinsically conductive polymers are the following: aqueous dispersion of polyaniline doped with methanesulfonic acid, aqueous dispersion of polypyrrole doped with methanesulfonic acid.

Examples of negatively charged p-doped intrinsically conductive polymers are the following: aqueous dispersion of poly(anilinesulfonic acid), polyaniline doped with excess of ligninsulfonic acid, polypyrrole doped with poly(styrenesulfonic) acid, polythiophene doped with exess of poly(styrenesulfonic) acid, poly(ethylenedioxythiophene) doped with exess of poly(styrenesulfonic) acid.

An example of a suspension with nanoparticles of conductive material is a 20 wt % graphite suspension from Acheson Graphite Company, Cambridge, USA. What is meant in the context of the present invention under the terms "nanoparticles" is particles having dimensions within the range of about 1 to 300 nm. For preparation of the suspension, the graphite is intensively stirred for a few minutes with a glass rod and then the water is slowly added under stirring. The pH of this dispersion is close to 10.

The nanoparticles for the above purpose may also be selected from the group consisting of nanometals, conductive titanium dioxide, antimony doped tin oxide, indium tin oxide, zirconium doped zinc oxide, and aluminum doped zinc oxide.

Another example may relate to oxidized carbon nanotubes (CNT) that also can be used as conductive nanoparticles.

It is very important to obtain excellent dispersion of conductive particles in liquid media and avoid formation of large agglomerates or clusters. This will reduce the defects within the sublayer and will lead to uniform thickness and electrical properties. The electrostatic adsorption of monolayers is the key to formation of uniform coatings. Good agglomerate-free dispersion of conductive particles in the liquid media also leads to their improved permeation into the fibers during the pretreatment step. The improved cluster-free dispersion is ensured by the highly charged state of the elementary nanoparticles because these highly charged colloidal particles tend to electrostatically repel each other. Good dispersion was also achieved by vigorous stirring of conductive particles into the liquid media and additional treatment in an ultrasonic bath.

Testing was carried out by measuring surface resistance in ohms/sq. with a 2 point Keithley Mod. 617 electrometer produced by Keithley of Cleveland, Ohio, or with a 4-point Loresta-EP probe Mod. MCP-T400 produced by Mitsubishi Petrochemical Co., Ltd., Japan. The conductive coatings obtained by the method of the invention are uniform and stable to UV light, laundering, or combination of heat and humidity. Excellent adhesion to the substrate makes these coatings clean for electronics applications.

One of the key features of the method of the present invention is that a combination of the pretreatment and subsequent LBL deposition process produces a synergistic effect. In other words, the combination of these steps produces higher electrical conductivity of fabric of the invention than each of these steps performed separately.

PRACTICAL EXAMPLE 1

STEP1. A sample of the fabric substrate was prepared. The sample of the fabric for this test was a non-pretreated stretchable Nylon lycra fabric manufactured by Milliken Co. The sample had dimensions of 1 square yard and weighed 4.8 to 5.3 oz per sq. yard. It was made of 86% nylon and 14% lycra.

STEP 2. A first solution was prepared in a plastic container, by dissolving 10 g of 50 wt % polyethyleneimine (PEI) from Aldrich Chemicals Co., Milwaukee, Wis., in 5 liters of deionized water, whereby a 0.1 wt.% PEI solution was obtained. The deionized water at room temperature and the PEI were loaded into a glass beaker and were subjected to magnetic stirring. The solution was approximately pH 9. This solution will be hereinafter referred to as Solution No. 1.

STEP 3. A second media was independently prepared in another plastic container by dispersing 250 g of 20 wt % graphite from Acheson Graphite Company, Cambridge, Mass., in 5 liters of deionized water. The final weight percent was approximately 1%. The graphite was intensively stirred for a few minutes with a glass rod and then the water was slowly added under stirring. The pH of this dispersion was close to 10. No adjustment of the pH was needed for this application. The prepared media will be referred to as Dispersion No. 1.

STEP 4. The fabric sample prepared in Step 1 was immersed for 10 to 15 minutes in Solution No. 1. After impregnation in Solution No. 1, the treated sample was washed 3 times in about 10 liters of fresh tap water. Drying was carried out in a 24 inch diameter vacuum nutch for 5 minutes at a reduced pressure of (under constant air flow) to remove excess of water. As a result, after treatment in Solution No. 1, the fabric was coated with the first nanolayer of PEI.

STEP 5. After drying was completed, the sample was immersed into Dispersion No. 1 for 20~30 minutes. Upon completion of the immersion step, the sample was washed three times with 10 liter portions of tap water. The excess of water was removed by drying in the vacuum nutch as in Step 4. The sample was washed with water again to complete cleanness. It was necessary to exclude any interaction between the residues (if any) of Solution No. 1 and Dispersion No. 1. As a result, the surface of the first nanolayer of PEI was enriched with graphite nanoparticles.

STEP 6. Steps 4 and 5 were repeated sequentially 3 more times. As a result, an electrically conductive Nylon lycra fabric was obtained.

STEP 7. The final drying was carried out by hanging for 15 to 30 minutes in an oven with air circulation and exhaust at 80° C.

STEP 8. Physical, chemical, and electrical characteristics of the obtained sample were measured.

The results of the test showed that 4 repetitions of Steps 4 and 5 of the method of the invention were sufficient to obtain a surface resistance of $10^7$ ohms/square.

PRACTICAL EXAMPLE 2

A sample of nylon-lycra fabric from Milliken Corp. of the same kind used in Practical Example 1 was boiled for 17 hours in an aqueous dispersion of graphite made by making a 1% dispersion of graphite from Aquadag E from Acheson Corp. The fabric was rinsed with tap water very well and dried at 110° C. The measured surface resistivity was $10^5$ ohms/sq.

PRACTICAL EXAMPLE 3

The nylon-lycra fabric pretreated in Practical Example 2 was treated with one bi-layer by the same LBL method as in Practical Example 1. The result showed that the pretreatment followed by one cycle of the LBL treatment yielded a result of $10^3$ ohms/sq.

PRACTICAL EXAMPLE 4

A nylon glove from Asia Idea Development of Hong Kong was treated with only the layer by layer method. No pretreatment was performed. Six bilayers were applied. The bilayer treatment consisted of a first layer of 0.1% polyethylene imine followed by a dispersion of SN100-D antimony-doped tin oxide. This was executed 3 times with the standard 3 rinses of tap water between each dipping. Each dipping was 5 minutes in duration. All drying occurred at 95° C. After 3 bilayers the glove measured $10^{10}$ ohms/sq. Three more bilayers were applied in the same way. After six bilayers the nylon glove measured $10^8$ ohms/sq.

PRACTICAL EXAMPLE 5

A nylon glove substrate from Asia Idea Development of Hong Kong, was pretreated by boiling at 100° C. for 3 hours in a dispersion of conductive antimony-doped tin oxide with pH 2. The dispersion was made by mixing 5 ml. of SN100-D and 5 ml. of FS10-D, both from Ishihara of Japan with 500 ml. of deionized water and titrating to pH 2 with phosphoric acid.

After 3 hours the nylon glove was rinsed 3 times in tap water and dried in a convection oven at 85° C. The surface resistivity for the pretreated nylon glove was $10^9$ ohms/sq. The initial surface resistivity of the nylon glove had been $10^{14}$ ohms/sq. Another nylon glove was boiled in the same solution for 12 hours and then rinsed with tap water and dried at 130° C. The surface resistivity was measured at $10^8$ ohms/sq after the 12 hour pretreatment.

PRACTICAL EXAMPLE 6

Step 1: The nylon glove from Practical Example 5, which had been pretreated for 3 hours, was subsequently treated by the layer by layer method. A dispersion of antimony doped tin oxide from Ishihara was made by mixing 10 ml. of SN10-D from Ishihara into 500 ml. of deionized water. It was then acidified to pH 2 with phosphoric acid lending a positive charge to the dispersed antimony tin oxide particles. A dispersion of aqueous 3,4 polyethylenedioxythiophene polystyrene sulfonate (Pedot) solution was made by mixing 20 grams of 1.3% Baytron P from H. C. Starck of Pittsburgh with 1 liter of deionized water.

Step 2: The nylon glove was dipped in the antimony doped tin oxide (SN100-D) dispersion for 5 minutes and then rinsed well with tap water. The glove was then dipped in the Pedot solution for 5 minutes and rinsed well with tap water. The procedure was repeated one more time. The glove was dried at 130° C. The surface resistivity was measured at $10^6$ ohms/sq.

PRACTICAL EXAMPLE 7

The procedure of Practical Example 6was repeated for nylon Velcro from Advance Fabrication of Salt Lake City and the final surface resistivity was measured at $10^6$ ohms/sq.

PRACTICAL EXAMPLE 8

A cotton glove from Asia Idea Development of Hong Kong was pretreated for 3 hours by the same process for pretreatment of the nylon glove in Practical Example 5. The surface resistivity was measured at $10^7$ ohms/sq. The initial surface resistivity was $10^{13}$ ohms/sq. or higher.

PRACTICAL EXAMPLE 9

Two samples of nonwoven polypropylene fabric were exposed to an atmospheric plasma pretreatment by Sigma Labs of Tucson. One was a blue polypropylene and the other was a white polypropylene. These fabric samples were provided by Kimberly Clark of Georgia. Both samples were then treated by the layer by layer method. Four bilayers were applied to the fabric samples.

The first layer of each bilayer was applied by dipping the fabrics into a 0.1% aqueous polyethylenimine solution made by diluting a 50% solution of polyethyleneimine from Aldrich Chemical of Milwaukee. The second layer of each bilayer was applied by dipping in a 0.1% aqueous 3,4-polyethylenedioxythiophene polystyrene sulfonate solution made from Baytron P from HC Stark. Three fresh tap water rinses were used after each dip. The samples were dried at 85° C. The surface resistivities measured were $10^5$ ohm/sq. for the blue polypropylene and $10^7$ ohm/sq. for the white polypropylene. The samples were exposed to 50° C. and 80% relative humidity for 11 days. Both samples measured $10^7$ ohms/sq. after this period.

As a comparison, two identical samples of polypropylene, not pretreated by the plasma treatment, were each given two bilayer applications of the same kind mentioned above. The surface resistivity measured for both was $10^{11}$. In all cases the color change was not appreciable after the bilayer treatments.

PRACTICAL EXAMPLE 10

Six polyester wipes, each about 8 inches by 8 inches, from Milliken Corp., were treated by the LBL method. This was performed using a 1.4% polyethyleneimine solution containing 0.3% SN100-D antimony doped tin oxide (from Ishihara) as the first layers and a 0.12% aqueous solution of 3,4-polyethylenedioxythiophene polystyrene sulfonate made by diluting 1.2% Baytron P HCV4 from H.C. Starck as the second layers. Three fresh tap water rinses were performed between each layer application with squeezing between each rinse and after each final rinse to remove excess moisture. After each bilayer the samples were dried at 95° C. After the application of one bilayer the surface resistivity was measured at $10^9$ ohms/sq. After a second bilayer the surface resistivity was measured at $5\times10^6$ ohms/sq.

PRACTICAL EXAMPLE 11

One square foot of clean, scoured quartz fabric from JPS Composites of Slater, SC was treated by the layer by layer method. The first layer of each bilayer was applied using antimony tin oxide (SN100-D from Ishihara Corp.) dispersed in polyethyleneimine solution. This was made by adding 15 g. of 33% polyethyleneimine solution from BASF Corp. to 500 grams of deionized water and mixing well. Then 5 g. of the antimony-doped tin oxide dispersion were added slowly to the polyethyleneimine solution while stirring rapidly. The second layer was applied using a 0.1% aqueous dispersion of 3,4-polyethylenedioxythiophene polystyrene sulfonate made by diluting 1.2% Baytron HCV4 from H.C. Starck. Five bilayers were applied to the quartz fabric. Three fresh tap water rinses were used between each 5 minute dip. After drying at 95° C. the surface resisitivity measured was $10^6$ ohm/sq. The color was a shiny translucent blue.

PRACTICAL EXAMPLE 12

One square foot of quartz fabric from JPS of SC was treated by the layer by layer method. A 0.1% solution of polyethyleneimine solution made from 33% polyethyleneimine solution from BASF was used for applying the first layer of each bilayer. The second layer of each bilayer was applied using a 1% dispersion of graphite particles made from Aquadag E from Acheson Corp. The first layers were applied using 5 minute dips. The second layers were applied using half hour dips. Three fresh water rinses were used between each dip. Five bilayers total were applied. After drying, the surface resistivity measured was $10^8$ ohms/sq.

PRACTICAL EXAMPLE 13

A substrate made of laminate of polyether-based polyurethane foam attached to polyester fabric was treated with the layer by layer method. Three 3 inch by 3 inch squares by 1 inch thick had 5 bilayers applied to them. The first layer of each bilayer was applied using a 0.1% solution of polyethylene imine made using a 50% polyethylene imine solution from Aldrich of Milwaukee. The second layers were applied using a 1% dispersion of graphite made from Aquadag by Acheson Corp. The pieces were immersed and then squeezed three times and then left for 5 minutes in the polyethyleneimine solution. Then they were squeezed to remove the excess and rinsed three times in fresh tap water with squeezing. They were squeezed again to remove excess rinse water. Then they were similarly exposed to the graphite dispersion but were left immersed for 10 minutes. Then they were squeezed to remove the excess and rinsed three times in fresh tap water with squeezing. They were then squeezed again to remove excess rinse water. All the samples were dried at 95° C. After the 5 bilayers were applied the foam pieces all measured on average $5\times10^5$ ohms/sq. When pressure was applied on the foam with the measuring probes these samples measured 10,000 to 30,000 ohms/sq. or at least one order less resistive.

PRACTICAL EXAMPLE 14

Various 3 inch by 3 inch square samples of polyester velour from Guilford Mills were treated with the layer by layer method using a 0.1% solution of polyethyleneimine made from a 33% solution of polyethylene imine from BASF Corp. for the first layers and a 0.1% dispersion of antimony doped tin oxide made from SN100D from Ishihara for the second layers. All immersions were five minutes for the first layers with squeezing of the velour and agitation of the liquid. The exposures for the second layers were about 10 minutes. Between each layer the samples were rinsed three times with fresh tap water and squeezed between each rinse and after the final rinse. All samples were then dried at 95° C. After a total of 6 bilayers the resistance of all velours was measured at $10^8$ ohms/sq.

Analysis of the results given in the practical examples shows that pretreatment by boiling in specific solutions or suspensions, some with a specific pH value, allows for a significant decrease in surface resistance and reduces the amount of LBL work needed to lower resistance into the static dissipative range. Thus it has been shown that the invention provides an electroconductive textile material that does not loose its electrical characteristics with the lapse of time and is stable to environmental conditions, such as humidity, temperature, and UV radiation. Furthermore, the invention provides a method of manufacturing electroconductive textile material that allows control of electrical resistivity of the material. It allows one to obtain material with targeted electrical characteristics through the use of layer-by-layer techniques that do not change or impair the properties of the fabric substrate, such as strength, stretchability, etc., and, in some cases, do not appreciably change the original substrate color.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, the textile material, solutions, nanosuspensions, microdispersions and treatment conditions described in the specification were given only as examples and should not be construed as limiting the scope of the invention that allows any changes and modifications within the scope of the attached claims.

The invention claimed is:

1. An electrically conductive fabric comprising: a fabric substrate material; and at least a first nanolayer of a first substance applied directly onto said fabric substrate material, and a second nanolayer of a second substance applied onto said first nanolayer; at least one of said first substance and/or second substance comprising a conductive substance selected from the group consisting of nanonarticles, conductive polymer, and a combination of nanoparticles with a conductive polymer; said second substance being selected from the group consisting of nanoparticles of graphite, metals, conductive metal oxides, and conductive polymers selected from the group consisting of polyaniline, poly(anilinesulfonic acid), polyaniline doped with ligninesulfonic acid, polypyrrole, polypyrrole doped with polystyrenesulfonic acid, polythiophene, poly(ethylenedioxythiophene) doped with polystyrenesulfonic acid; and said conductive metal oxides being selected from the group consisting of conductive titanium dioxide, antimony doped tin oxide, aluminum doped zinc oxide, and zirconium doped zinc oxide.

2. The electroconductive fabric of claim 1, wherein said conductive metal oxides are selected from the group consisting of conductive titanium dioxide, antimony doped tin oxide, aluminum doped zinc oxide, and zirconium doped zinc oxide; said electroconductive fabric comprising a plurality of the monolayers of said second substance applied in sequence one onto the other by means of layer-by-layer technique.

3. An electrically conductive fabric of claim 1, wherein said first nanolayer and said second nanolayer each has a thickness within the range of 1 nm to 300 nm. and wherein said conductive metal oxides are selected from the group consisting of conductive titanium dioxide, antimony doped tin oxide, aluminum doped zinc oxide, and zirconium doped zinc oxide.

4. An electrically conductive fabric comprising: a fabric substrate material: and at least a first nano layer of a first substance applied directly onto said fabric substrate material, and a second nanolayer of a second substance applied onto said first nanolayer: at least one of said first substance and/or second substance comprising a conductive substance selected from the group consisting of nanoparticles, conductive polymer, and a combination of nanoparticles with a conductive polymer: said first substance being selected from the group consisting of nanoparticles of graphite, metals, conductive metal oxides, and conductive polymers selected from the group consisting of nolyaniline, poly(anilinesulfonic acid), polyaniline doped with ligninesulfonic acid, polypyrrole, polypyrrole doped with polystyrenesulfonic acid, polythiophene, and poly(ethylenedioxythiophene) doped with polystyrenesulfonic acid: said second substance is selected from the group consisting of poly(2-acrylamido-2-methyl-1-propanesulfonic acid), poly(2-acrylamido-2-methyl-1-propanesulfonic acid-co-acrylonitrile), poly(2-acrylamido-2-methyl-1-propanesulfonic acid-co-styrene), poly(acrylic acid, sodium salt), sodium salts of polyacrylic acid having different molecular weights, sodium salt of poly(anetholesulfonic acid), poly(styrene-alt-maleic acid) sodium salt, poly(4-styrenesulfonic acid), poly(4-styrenesulfonic acid) ammonium salt, poly(4-styrenesulfonic acid) lithium salt, poly(4-styrenesulfonic acid) sodium salt, poly(4-styrenesulfonic acid-co-maleic acid) sodium salt. poly(vinyl sulfate) potassium salt, poly(vinylsulfonic acid) sodium salt, poly (acrylamide-co-diallyldimethylammonium chloride), poly (allylamine hydrochloride), poly(diallyldimethylammonium chloride), and manganese(II) hexafluoroacetyl acetonate trihydrate. ligninsulfonic acid. heparin, and polyethyleneimine: and said conductive metal oxides being selected from the group consisting of conductive titanium dioxide, antimony doped tin oxide and aluminum doped zinc oxide.

5. An electrically conductive fabric comprising: a fabric substrate material: and at least a first nanolayer of a first substance applied directly onto said fabric substrate material, and a plurality of monolavers of a second substance applied onto said first nanolayer: at least one of said first substance and/or second substance comprising a conductive substance selected from the group consisting of nanoparticles, conductive polymer, and a combination of nanoparticles with a conductive polymer: said second substance is selected from the group consisting of poly(2-acrylamido-2-methyl-1-propanesulfonic acid) , poly(2-acrylamido-2-methyl-1-propanesulfonic acid-co-acrylonitrile), poly(2-acrylamido-2-methyl-1-propanesulfonic acid-co-styrene), poly(acrylic acid, sodium salt), sodium salts of polyacrylic acid having different molecular weights, sodium salt of poly(anetholesulfonic acid), poly(styrene-alt-maleic acid) sodium salt, poly(4-styrenesulfonic acid), poly(4-styrenesulfonic acid) ammonium salt, poly(4-styrenesulfonic acid) lithium salt. poly(4-styrenesulfonic acid) sodium salt, poly(4-styrenesulfonic acid-co-maleic acid) sodium salt, poly(vinyl sulfate) potassium salt, poly(vinylsulfonic acid) sodium salt, poly(acrylamide-co-diallyldimethylammonium chloride), poly(allylamine hydrochloride), poly(diallyldimethylammonium chloride), and manganese(II) hexafluoroacetyl acetonate trihydrate, ligninsulfonic acid. heparin, and polyethyleneimine; and, wherein said first substance is selected from the group consisting of nonoparticles of graphite, metals, conductive metal oxides, and conductive polymers.

6. The electroconductive fabric of claim 5, wherein said conductive metal oxides are selected from the group consisting of conductive titanium dioxide, antimony doped tin oxide and aluminum doped zinc oxide.

7. An electrically conductive fabric comprising: a fabric substrate material: and at least a first nanolayer of a first substance applied directly onto said fabric substrate material, and a second nanolayer of a second substance applied onto said first nanolayer: at least one of said first substance and/or second substance comprising a conductive substance selected from the group consisting of nanoparticles, conductive polymer, and a combination of nanoparticles with a conductive polymer: said first substance being selected from the group consisting of nanonarticles of graphite, metals, conductive metal oxides, and conductive polymers selected from the group consisting of polyaniline. poly(anilinesulfonic acid). polyaniline doped with ligninesulfonic acid, polypyrrole, polypyrrole doped with polystyrenesulfonic acid. polythiophene. and poly(ethylenedioxythiophene) doped with polystyrenesulfonic acid:

said second substance being selected from the group consisting of poly(2-acrylamido-2- methyl-1-pronanesulfonic acid) , poly(2-acrylamido-2-methyl-1-pronanesulfonic acid-co- acrylonitrile), poly(2-acrylamido-2-methyl-1-nropanesulfonic acid-co-styrene), poly(acrylic acid, sodium salt), sodium salts of polyacrylic acid having different molecular weights, sodium salt of poly(anetholesulfonic acid), poly(styrene-alt-maleic acid) sodium salt, poly(4-styrenesulfonic acid), poly(4-styrenesulfonic acid) ammonium salt, poly(4-styrenesulfonic acid) lithium salt, poly(4-styrenesulfonic acid) sodium salt, poly(4-styrenesulfonic acid-co-maleic acid) sodium salt, poly(vinyl sulfate) potassium salt, poly(vinylsulfonic acid) sodium salt, poly(acrylamide-co-diallyldimethylammonium chloride), poly(allylamine hydrochloride), poly(diallyldimethylammonium chloride), and manganese(II) hexafluoroacetyl acetonate trihydrate. ligninsulfonic acid. heparin, and polvethyleneimine: said first nanolayer and said second nanolayer each having a thickness within the range of 1 nm to 300 nm: and said conductive metal oxides being selected from the group consisting of conductive titanium dioxide, antimony doped tin oxide and aluminum doped zinc oxide.

* * * * *